(12) United States Patent
Bisheh Niasar et al.

(10) Patent No.: US 12,470,370 B2
(45) Date of Patent: Nov. 11, 2025

(54) HASH BASED CRYPTOGRAPHY ACCELERATOR

(71) Applicant: Microsoft Technology Licensing, LLC, Redmond, WA (US)

(72) Inventors: Mojtaba Bisheh Niasar, Ithaca, NY (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 18/388,486

(22) Filed: Nov. 9, 2023

(65) Prior Publication Data

US 2025/0158806 A1 May 15, 2025

(51) Int. Cl.
*H04L 29/06* (2006.01)
*H04L 9/06* (2006.01)
*H04L 9/08* (2006.01)

(52) U.S. Cl.
CPC .......... *H04L 9/0836* (2013.01); *H04L 9/0643* (2013.01)

(58) Field of Classification Search
None
See application file for complete search history.

(56) References Cited

U.S. PATENT DOCUMENTS

2002/0184504 A1\* 12/2002 Hughes ................. H04L 9/3236
713/176

FOREIGN PATENT DOCUMENTS

CN 112152792 A \* 12/2020 ............... H04L 9/50
CN 117941317 A \* 4/2024 ........... H04L 9/3252

\* cited by examiner

*Primary Examiner* — Andrew J Steinle
(74) *Attorney, Agent, or Firm* — Schwegman Lundberg & Woessner, P.A.

(57) ABSTRACT

A hash-based cryptographic system includes hash input registers and hash generators coupled in parallel with each other. Each hash generator of the hash generators is coupled to receive a corresponding hash input from one of the input registers. A controller is coupled to the input registers and configured to provide the corresponding hash input to the hash registers to cause the parallel hash generators to generate a private key for corresponding leaf nodes of a hash-based signature tree structure.

20 Claims, 10 Drawing Sheets

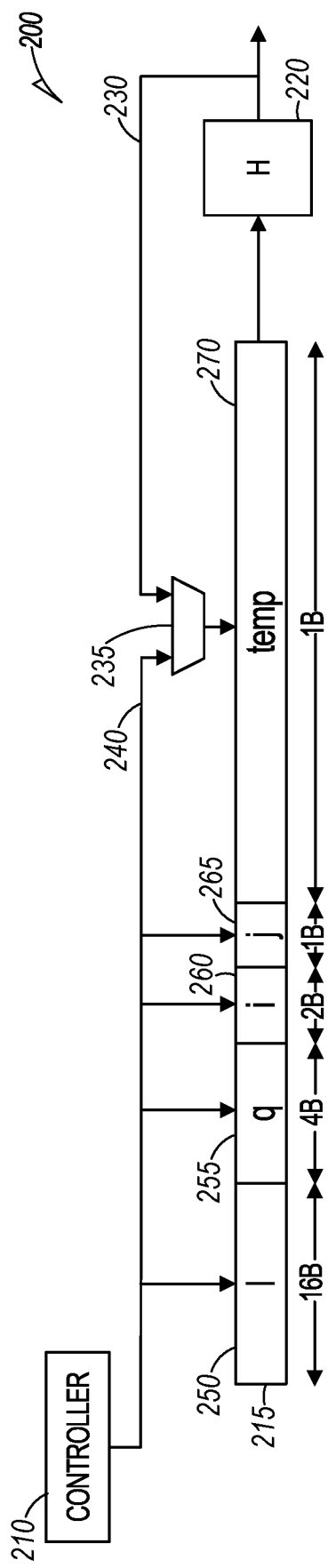
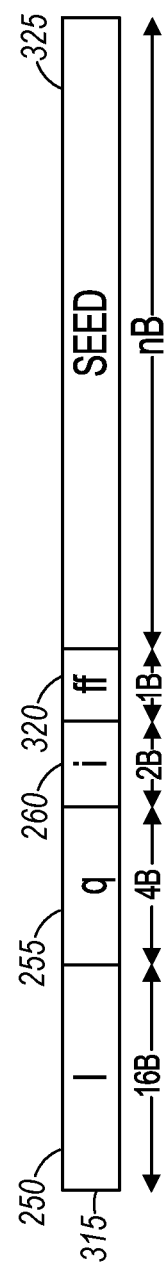
FIG. 2
FIG. 3

```
def lm_ots_keygen (I, q, SEED):
    ##private key
515─for i in range p:
        x[i] = H(I || u32str(q) || u16str(i) || u8str(0xff) || SEED)

#public key
520─for i in range p:
525─    tmp = x[i]
530─    for j in range 2**w - 1:
535─        tmp = H(I || u32str(q) || u16str(i) || u8str(j) || tmp)
540─    y[i] = tmp 550─K = H(I || u32str(q) || u16str(D_PBLC) || y[0] || ... || y[p-1])
```

FIG. 5

```
610— def lm_ots_keygen (I, q, C, message, x):
615—   Q = H(I || u32str(q) || u16str(D_MESG) || C || message)
617—   for i in range p:
620—       a = coef(Q || Cksm(Q), i, w)
625—       tmp = x[i]
630—       for j in range (0, a - 1):
635—           tmp = H(I || u32str(q) || u16str(i) || u8str(j) || tmp)
640—       s[i] = tmp
650—   return s
```

FIG. 6

```
710— def lm_ots_verifying(I, q, C, message, s, K)
715— Q = H(I || u32str(q) || u16str(D_mesg) || C || message)
720— for i in range (0, a - 1):
725—   a = coef(Q || cksm(Q), i, w)
730—   tmp = x[i]
735—   for j in range(a, 2**w - 1):
740—     tmp = H(I || u32str(q) || u16str(i) || u8str(j) || tmp)
745—   z[i] = tmp 750— Kc = H(I || u32str(q) || u16str(D_PBLC) || z[0] || z[1] || ... || z[p-1])
755— return Kc == K
```

FIG. 7

| 815 | 820 | 825 | \|— 810 Core Number (K) —\| | | | | | |
|---|---|---|---|---|---|---|---|---|
| N | W | P | 1 | 2 | 4 | 8 | 16 | 32 |
| 32 | 1 | 256 | 256 | 133 | 67 | 34 | 17 | 9 |
| 32 | 2 | 133 | 133 | 67 | 34 | 17 | 9 | 5 |
| 32 | 4 | 67 | 67 | 34 | 17 | 9 | 5 | 3 |
| 32 | 8 | 34 | 34 | 17 | 9 | 5 | 3 | 2 |

| HASH TYPE | INPUT SIZE (B) | OUTPUT SIZE (B) | ITERATION | SECURITY IN BITS (MORE IS BETTER) | | | CRITICAL PATH |
|---|---|---|---|---|---|---|---|
| | | | | COLLISION | PREIMAGE | 2ND PREIMAGE | |
| SHA256 | 1 | 256 | 256 | 128 | 256 | 255.5 | 2 XOR+7 32-BIT ADDRS |
| SHAKE256/256 | 2 | 133 | 133 | 128 | 256 | 256 | 7 XOR+1NOT+1 AND |

HASH BASED CRYPTOGRAPHY ACCELERATOR

BACKGROUND

The advent of quantum computers poses a serious challenge to the security of the existing public-key cryptosystems. Existing public-key cryptosystems can potentially be broken by quantum computers based on Shor's algorithm.

Hash-based cryptosystems are used to create a large number of one-time signatures and are among the most promising post quantum computer algorithms. The hash-based cryptosystems are believed to be hard to break for both classical and quantum computers.

The American National Institute of Standards and Technology (NIST) selected a Leighton-Micali Signature (LMS) system as a standard (ISSN: 2070-1721) for post-quantum cryptography in 2020. The LMS system uses a Merkle tree structure to combine many one-time signature keys, represented by leaves of the tree structure, into a single public key, represented by a root node that resides at the top of the tree structure. LMS cryptography is resistant to quantum attacks and can achieve a high level of security without relying on large integer mathematics.

SUMMARY

A hash-based cryptographic system includes hash input registers and hash generators coupled in parallel with each other. Each hash generator of the hash generators is coupled to receive a corresponding hash input from one of the input registers. A controller is coupled to the input registers and configured to provide the corresponding hash input to the hash registers to cause the parallel hash generators to generate a private key for corresponding leaf nodes of a hash-based signature tree structure.

BRIEF DESCRIPTION OF THE DRAWINGS

FIG. 2 is a block representation of a reconfigurable hash chain that is controlled by a controller according to an example embodiment.

FIG. 3 is a block diagram of input register having parameters used for generating a private key for a leaf node according to an example embodiment.

FIG. 5 is a pseudocode representation of a key generation method according to an example embodiment.

FIG. 6 is a pseudocode representation of a one-time signature generation method according to an example embodiment.

FIG. 7 is a pseudocode representation of a one-time signature verification method according to an example embodiment.

FIG. 8 illustrates a number of iterations for each of the cryptographic functions associated with a hash-based cryptographic signature tree according to an example embodiment.

FIG. 9 is a table illustrating parameters of different hash algorithms which may be used according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Hash-based signature schemes create a number of one-time signature key pairs, with each key pair only being used to sign one message. If a one-time key pair were to be used to sign two different messages, an attacker could forge signatures.

The American National Institute of Standards and Technology (NIST) selected a Leighton-Micali Signature (LMS) system as a standard (ISSN: 2070-1721) for post-quantum cryptography in 2020. The LMS system uses a Merkle tree structure to combine many one-time signature keys, represented by leaves of the tree structure, into a single public key, represented by a root node that resides at the top of the tree structure. LMS cryptography is resistant to quantum attacks and can achieve a high level of security without relying on large integer mathematics. LMS is likely to be used in a next generation of cryptosystems. LMS will be implemented and evaluated on various platforms and applications, especially for cloud computing, which demands high performance and security.

The generation of multiple one-time signature pairs involves a significant processing effort. An improved hardware accelerator utilizes parallel hash functions to generate one-time key pairs more quickly than prior methods, providing high performance and security.

Figure 1:
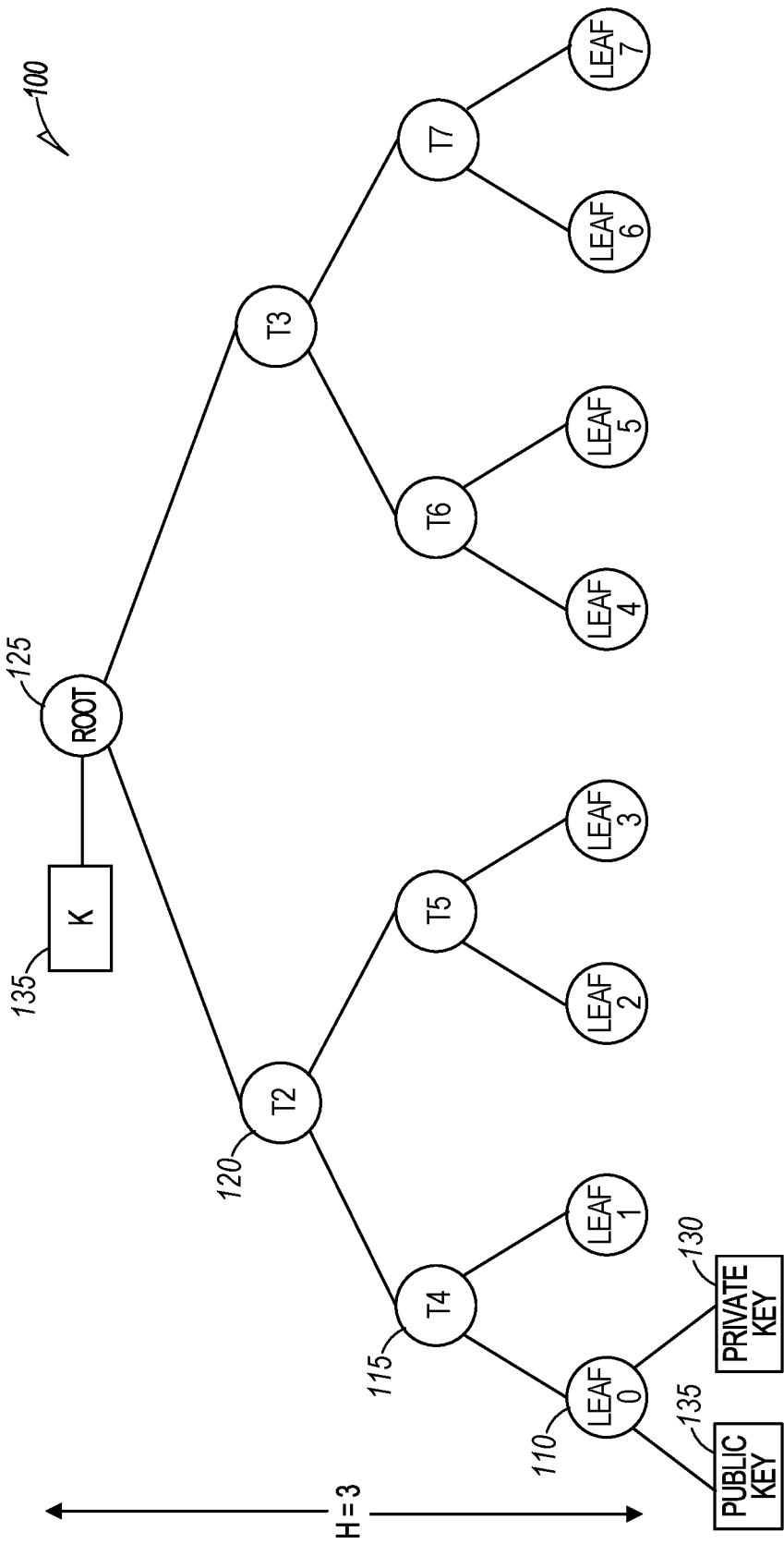
FIG. 1 is an example of a tree structure representing key generation according to an example embodiment.

FIG. 1 is an example of a tree structure 100 representing key generation. Tree structure 100 includes eight leaf nodes 110 shown as leave nodes 0-7, a first layer of internal nodes 115 shown as nodes T4-T7, a second level of internal nodes 120 shown as nodes T2 and T3, and root node 125. More or fewer leaf nodes and internal nodes can be present in a tree structure.

The leaf nodes 110 each represent one-time signature keys generated using a cryptographic hash function. The keys include a private key 130 and a public key 135 pair, each of which are different for each of the leaf nodes 110. Generation of the one-time signature keys involve using the cryptographic hash function in a highly repetitive manner. Such signature keys are one-time signature (OTS) keys and may be used one time to sign a message. Tracking of which OTS keys have been used may be performed using a bit map or other structure, such as a table or list that includes a bit associated with each leaf node 110. The bit may be changed once a private key has been used to indicate that the private key is no longer available for use. Further messages may be signed using un-used private keys.

Parameters of the tree structure 100 include n, w, p, H, and h.

n is the number of bytes of an output of the cryptographic hash function. The number of such bytes is 32 in one example.

w is the width (in bits) of Winternitz coefficients, that is, the number of bits from the hash or checksum that is used with a single Winternitz chain. Example values include 1, 2, 4, and 8. The value of w describes a space/time trade-off. Increasing the value of w will cause the signature to shrink (by decreasing the value of p) while increasing the amount of time needed to perform operations with it. Such operations include generating the public key and generating and verifying the signature. In general, a Leighton-Micali one-time signature (LM-OTS) is 4+n*(p+1) bytes long, and public key generation will take $p*(2^w-1)+1$ hash computations (and signature generation and verification will take approximately half that on average).

p is the number of n-byte string elements that make up the one-time signature. Example values of p include 265, 133, 67, and 34.

H represents the cryptographic hash function.

h is the height of the tree 100. As shown, the height, h, is 3, which results in $2^3=8$ one-time signature key pairs represented by leaf nodes 110. In further examples, h may be larger, such as 10, 15, 20, or 25 (which results in 33554432 key pairs.) After each leaf node signature key pair is used, a new tree may be generated to continue signing messages.

Internal nodes 115 and 120 have values that are a hash of the concatenated values of the public keys of two of the nodes below them. For example, internal node 120 T4 is a hash of leaf 0 and leaf 1. T5 is a hash of leaf 2 and leaf 3. T6 is a hash of leaf 4 and leaf 5. T6 is a hash of leaf 6 and leaf 7. Internal nodes 120 are hashes of internal nodes 115. T2 is a hash of T4 and T5. T3 is a hash of T6 and T7. Finally, root node 125 is a hash of internal nodes T2 and T3. The nodes in each layer of the tree 100 are hashes of the public key values of two edge connected lower level nodes. The root node 125 value is a public key (K) 135 for the entire tree 100 which is essentially a hash of all the public keys of the leaf nodes. In one example, the same cryptographic hash function may be used to calculate the values in each node of tree 100. The public key for the entire tree 100 may be used to validate a message signed using any one of the leaf node private keys.

FIG. 2 is a block representation of a reconfigurable hash chain 200 that is controlled by a controller 210. Hash chain 200 includes an input register 215 coupled to provide parameters to a cryptographic hash function 220 input 225. An output 230 of the cryptographic hash function 220 is provided to multiplexor 235. Output of the multiplexor 235 is controlled by the controller 210.

The output 230 of the cryptographic hash function 220 is a temp (tmp) value that is selectively provided (by the controller 210 control of multiplexor 235) to the input register 215 for provision back to the cryptographic hash function 220.

The input register 215 includes several parameters provided by the controller 210 via an input line 240 or via output 230 depending on the function to be performed. The parameters provided depend on the particular cryptographic function to be performed. For performing selected aspects of key generation, signing, and verifying signed messages, input register 215 includes an I field 250, q field 255, i field 260, and j field 265 in addition to a temp field 270 for holding the temp value output of the cryptographic hash function 220. I is a constant defined by the ISSN: 2070-1721 LMS standard. q is a leaf node identifier, and i and j are parameters defined by the LMS standard.

FIG. 3 is a block diagram of input register 315 having parameters provided by controller 210 used for generating a private key for a leaf node. Input register 315 is the same as input register 215 except for some different parameters provided by controller 210. Hash chain 200 is reconfigured by modifying the parameters and functioning of hash chain 200 for generating the private key. Input register 315 is provided several parameters that are the same as those used in FIG. 2, including I field 250, q field 255, and i field 260. Input register 315 also includes an ff field 320 and a SEED field 325 instead of the temp field 235. ff is an 8 bit number used to convert the leaf number, q, to 32 bits so that input register 315 contains the same number of bits as input register 215. The SEED field 325 is used to provide a different SEED value for each private key to be generated. Note that input register 315 does not need to have input from the multiplexor 235 for generation of private keys.

Figure 4:
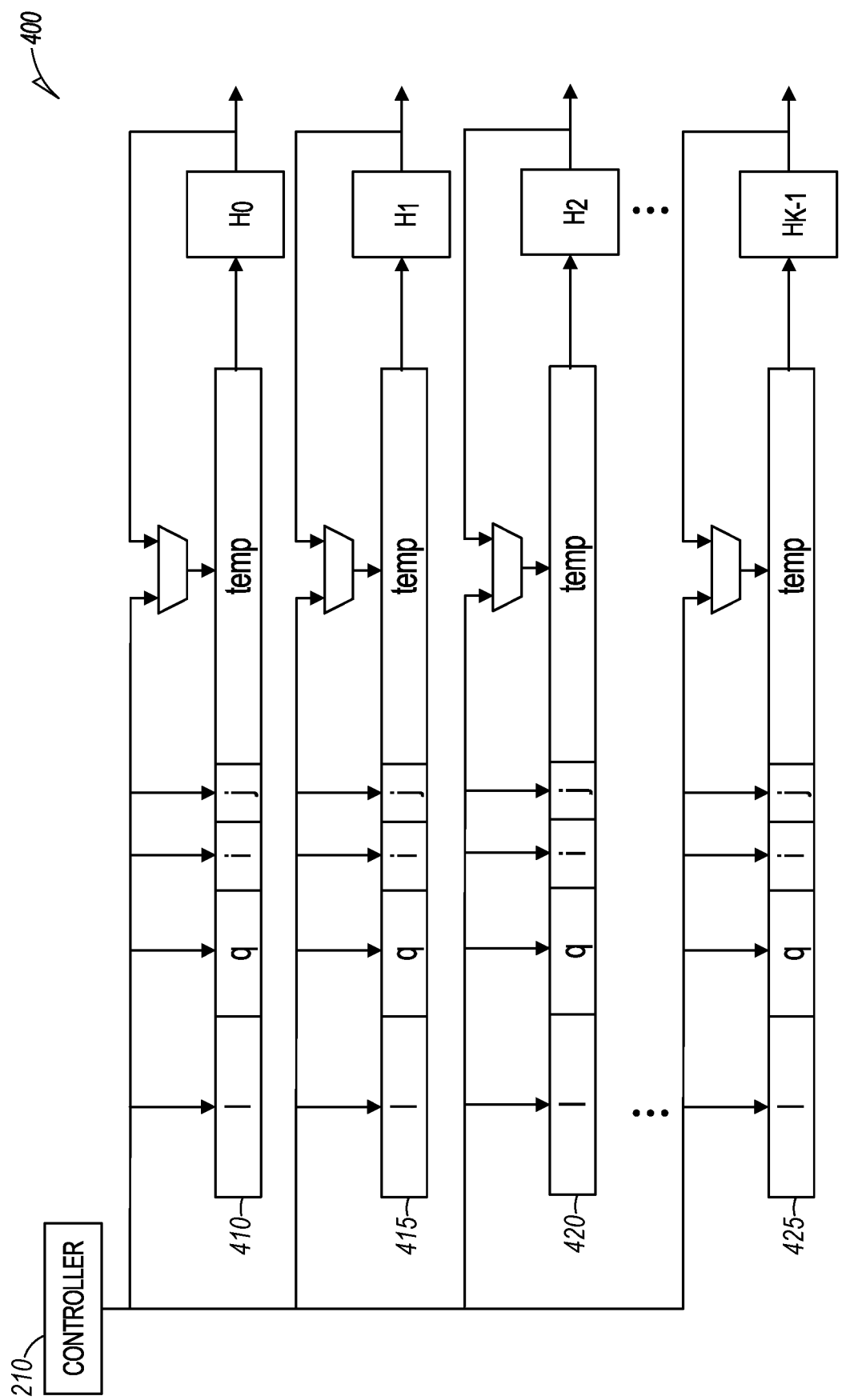
FIG. 4 is a block representation of a cryptographic system having parallel hash chains according to an example embodiment.

FIG. 4 is a block representation of a cryptographic system 400 having parallel hash chains 410, 415, 420, and 425 controlled by controller 210, forming a hardware accelerator. By reconfiguring the hash chains via the controller, system 400 can provide parallel processing for generating keys for leaf nodes and for other cryptographic functions that do not have dependencies such as portions of message signature generation and verification. For example, leaf node key generation does not need the temp feedback from hash function 220, allowing parallel generation of leaf node keys. The number of hash chains and hash functions can be configured for different performance levels versus hardware real estate consumption, creating a trade-off between the resource utilization and performance depending on a target application. For more performance, more hash chains, also referred to as hashing engines may be included at the cost of utilizing more hardware resources. The output of each hash chain may be provided back to controller 210 or to firmware for further processing and storage for use in signing messages and validating messages.

FIG. 5 is a pseudocode representation of a key generation method referred to as keygen 500. Keygen 500 is a one-time signature key generation process that has inputs at 510 of I, q, and SEED. I, as indicated above is defined by the protocol, and q identifies the leaf node. Keygen 500 is called for each leaf node, q. Private key generation is performed via a private key generation loop 515 in which the hash function 220 is performed for a leaf node, q, on a concatenated string that includes I||q|| i (the loop counter for p iterations) ||ff|| SEED. In one example, p may be 67. Thus, the loop is performed 67 times to generate a private key, x[i] for one leaf node. Since there is no dependency on temp in private key generation, Keygen 500 private key generation may be performed in parallel on the parallel hash chains.

Public key generation begins at a first public key generation loop 520, with temp set at 525 as tmp=x[i], the private key generated for leaf q. A second public key generation loop 530 of $2^W-1$ iterations over i is performed, with tmp being calculated as a hash function 220 applied to I, q, i, j, and tmp at 535. The public key is then defined at 540 as y[i]=tmp. The public key generation has a dependency on tmp for a previous iteration in the loop 530 and cannot be performed in parallel. In one example firmware may be utilized to perform the calculations.

The public key, K, for the tree 100 at root node 125 is then calculated at 550 as a hash function 220 of a concatenation of I∥q∥D_PBLC∥y[0]∥ . . . ∥y[p−1]. Firmware may be used to perform the calculation in one example.

The LM-OTS keygen 500 provides inherent parallelism in hardware implementation. Hence, these computation tasks can be split into p separate tasks, which are very compatible with hardware acceleration using parallel processing units.

Signing and verifying algorithms can be considered as a partial operation of hash chain in the keygen operation. Part of the hash chain, from 0 to a−1, is performed in the signature generation procedure. When verifying the signature, the rest of the hash chain, from "a" to $2^W-1$, is finished using the array s.

FIG. 6 is a pseudocode representation of a one-time signature generation method referred to as lm_ots-signing 600 in which parameters I, q, C, message, and x, the private key at an unused leaf node, are defined. C is a parameter defined by the protocol. At 615, Q is set to a hash of concatenated parameters including I∥q∥D_MESG∥C∥ message.

A signature generation first loop 617 iterates p times over i and calculates a=coef (Q∥Cksm(Q)∥i∥w) at 620, where Cksm(Q) is the checksum of Q. At 625, tmp is set to x[i], the private key for leaf node q.

A signature generation second loop 630 iterates 0-(a−1) times over j and sets tmp=a hash of concatenated parameters I∥q∥i∥j∥ tmp. The signature is then calculated as s[i]=tmp at 640, and at the end of the loops, s is returned as the signature at 650.

FIG. 7 is a pseudocode representation of a one-time signature verification method referred to as lm_ots-verifying 700 in which parameters I, q, C, message, s, and K are defined at 710. At 715, Q is set to a hash of concatenated parameters including I∥q∥D_MESG∥C∥ message. A signature verification first loop 720 iterates p times over i and calculates a=coef (Q∥Cksm(Q)∥i∥w) at 725, where Cksm(Q) is the checksum of Q. At 730, tmp is set to s[i].

A signature verification second loop 735 iterates a-$(2^W-1)$ times over j and at 740 sets tmp=a hash of concatenated parameters I∥q∥i∥j∥tmp. At 745, z[i]=tmp. At 750, Kc is calculated as a hash of concatenated parameters I∥q∥D_PBLC∥z[1]∥ . . . ∥z[p−1]. At the end of the loops, Kc=K is returned at 755, which should match the public key, K.

FIG. 8 illustrates the number of iterations for each of the cryptographic functions associated with tree 100 generally at 800. The number of cores (k), or hash chains, is varied at 810 (1, 2, 4, 16, and 32) to show the number of cycles needed to perform functions, such as key generation at the leaf node level. Parameters include N 815—the number of bytes of the output of the hash function, w 820—the width (in bits) of the Winternitz coefficients, and p 825—the number of n-byte string elements that make up the LM-OTS signature. In row 830, N=32, w=1, and p=256, resulting in 256 iterations with one core, and only 9 iterations with 32 cores, a large computing performance enhancement.

FIG. 9 is a table 900 illustrating parameters of different hash algorithms which may be used. Two main hash functions are recommended by NIST for LMS based systems, including SHA256 in row 910 and SHAKE256 in row 915. These hash functions can be configured for 24 bytes or 32 bytes outputs, shown by SHA256, SHA256/192, SHAKE256/256, and SHAKE256/192.

SHA256 belongs to the SHA2 family, while SHAKE256 belongs to the SHA3 family. In particular, SHAKE256 is a type of extendable-output function (XOF) that can produce an output of any length as needed.

Figure 10:
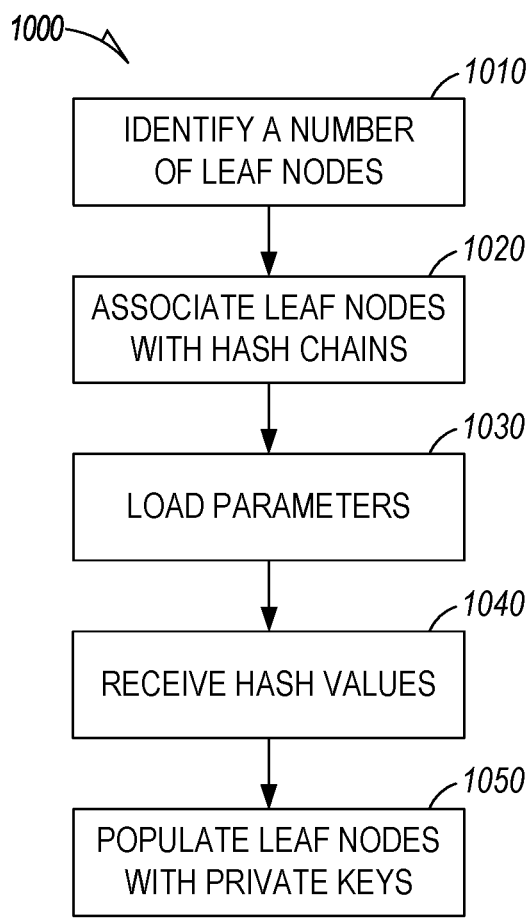
FIG. 10 is a flowchart illustrating a method for generating private keys for leaf nodes of a hash-based cryptographic signature tree according to an example embodiment.

FIG. 10 is a flowchart illustrating a method 1000 for generating private keys for leaf nodes of a hash-based cryptographic signature tree. Method 1000 begins at operation 1010 by identifying a number, q, of the leaf nodes. At operation 1020, each leaf node is associated with a respective one of multiple parallel hash chains. For example, if there are 8 leaf nodes, and 4 hash chains, nodes 0 and 4 would be assigned to the first hash chain, 1 and 5 to the next, 2 and 6 to the next, and the fourth hash chain would be associated with nodes 3 and 7.

Loading a respective input register associated with each respective hash chain with a respective leaf node number, cryptographic parameters, and a seed is performed at operation 1030. Respective hash values are received at operation 1040 from the respective hash chains. Since there are 8 leaf nodes, and four hash chains the four hash chains will each generate two successive hash values for their associated leaf nodes, generating four at a time in parallel. At operation 1050, the respective leaf nodes are populated with the respective hash values comprising a respective private key for each leaf node.

Figure 11:
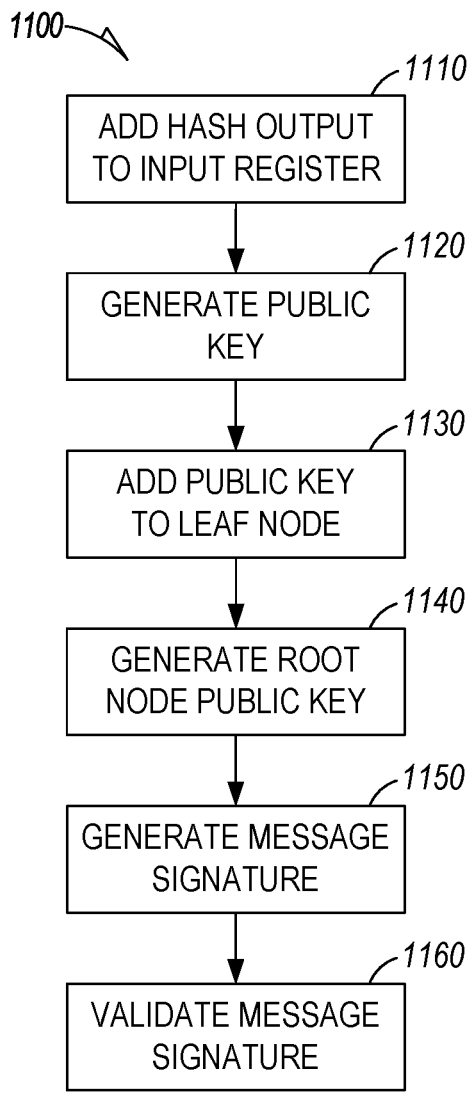
FIG. 11 is a flowchart illustrating a method for generating public keys for leaf nodes of the has-based cryptographic signature tree according to an example embodiment.

FIG. 11 is a flowchart illustrating a method 1100 for generating public keys for leaf nodes of the hash-based cryptographic signature tree. Method 1100 begins at operation 1110 by adding to the output of the respective hash generator to the respective input register. Operation 1120 generates a respective public key as a function of the respective private key.

The respective leaf nodes are populated at operation 1130 with the respective public keys to create one-time key signature pairs. Operation 1140 generates a root node public key based on a hash of all the leaf node private keys. Operation 1150 generates a message signature based on the public and private keys of one of the leaf nodes that has not yet been used to generate a message signature.

Operation 1160 validates a signed message that has been signed based on the public and private keys of one of the leaf nodes.

Figure 12:
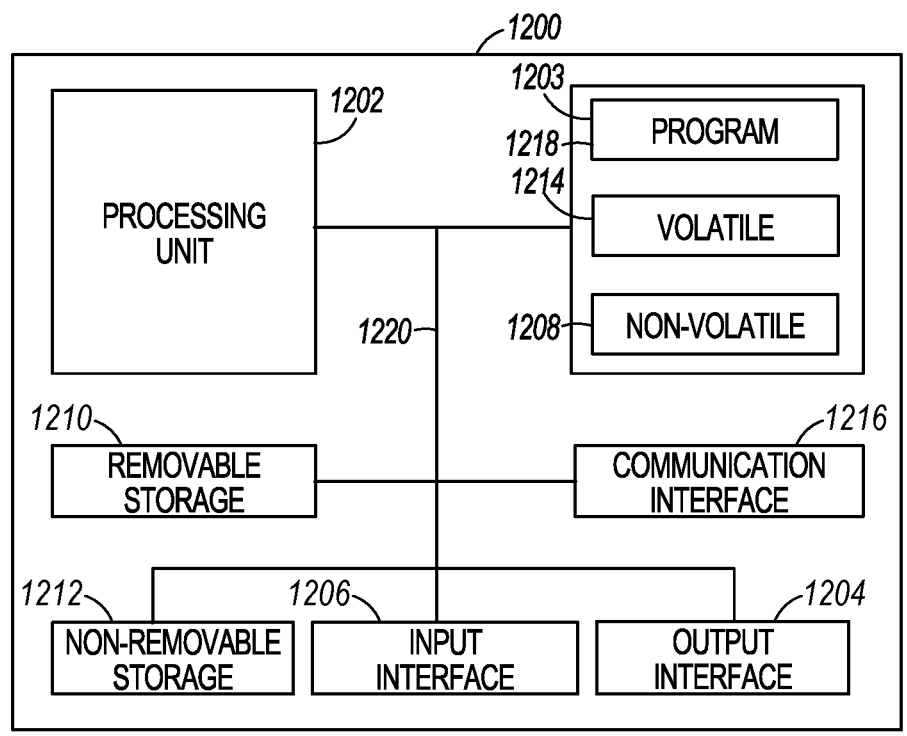
FIG. 12 is a block schematic diagram of a computer system to implement one or more example embodiments.

FIG. 12 is a block schematic diagram of a computer system 1200 to implement the controller and firmware aspects and for performing methods and algorithms according to example embodiments. All components need not be used in various embodiments.

One example computing device in the form of a computer 1200 may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, smart storage device (SSD), or other computing device including the same or similar elements as illustrated and described with regard to FIG. 12. Devices, such as smartphones, tablets, and smartwatches, are generally collectively referred to as mobile devices or user equipment.

Although the various data storage elements are illustrated as part of the computer 1200, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1203 may include volatile memory 1214 and non-volatile memory 1208. Computer 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input interface 1206, output interface 1204, and a communication interface 1216. Output interface 1204 may include a display device, such as a touchscreen, that also may serve as an input device. The input interface 1206 may include one or more of a touchscreen, touchpad, mouse, keyboard, camera, one or more device-specific buttons, one or more sensors integrated within or coupled via wired or wireless data connections to the computer 1200, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1200 are connected with a system bus 1220.

Computer-readable instructions stored on a computer-readable medium are executable by the processing unit 1202 of the computer 1200, such as a program 1218. The program 1218 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1218 along with the workspace manager 1222 may be used to cause processing unit 1202 to perform one or more methods or algorithms described herein.

Examples

1. A hash-based cryptographic system includes hash input registers and hash generators coupled in parallel with each other. Each hash generator of the hash generators is coupled to receive a corresponding hash input from one of the input registers. A controller is coupled to the input registers and configured to provide the corresponding hash input to the hash registers to cause the parallel hash generators to generate a private key for corresponding leaf nodes of a hash-based signature tree structure.

2. The system of example 1 wherein the hash-based signature tree structure includes a Leighton-Micali Signature (LMS) signature tree structure.

3. The system of any of examples 1-2 wherein the controller is configured to provide the hash input register with a leaf node number and a seed such that the generator generates a private key for each leaf node.

4. The system of any of examples 1-3 wherein each hash generator includes a feedback loop coupled between an output of the hash generator to the respective input register.

5. The system of example 4 wherein the feedback loop includes a multiplexor coupled to receive the output of the hash generator and coupled to the controller.

6. The system of example 5 wherein the controller is configured to populate the respective hash input register with the output of the hash generator such that the hash generator generates a public key as a function of the private key at each respective leaf node.

7. The system of example 6 wherein the controller is configured to reconfigure the hash generators between calculating the private key and the public key.

8. The system of any of examples 6-7 wherein the controller is configured to reconfigure the hash generators between calculating the private key, the public key, a message signature, and validating a signed message.

9. The system of example 8 wherein the controller is configured to generate a root node public key based on a hash of all the leaf node public keys.

10. The system of any of examples 8-9 wherein the controller is configured to generate a message signature based on the public key and the private key of one of the leaf nodes.

11. The system of any of examples 8-10 wherein the controller is configured to validate a signed message that has been signed based on the public and private keys of one of the leaf nodes.

12. A computer implemented method of generating keys for leaf nodes of a hash-based cryptographic signature tree includes identifying a number, q, for each leaf nodes, associating each leaf node with a respective one of multiple parallel hash chains, loading a respective input register associated with each respective hash chain with a respective leaf node number q, cryptographic parameters, and a seed, receiving respective hash values from the respective hash chains, and populating the respective leaf nodes with the respective hash values including a respective private key for each leaf node.

13. The method of example 12 and further including adding the respective hash values generated by the respective hash generators to the respective input registers, generating a respective public key as a function of the respective private key, and populating the respective leaf nodes with the respective public keys to create one-time key signature pairs.

14. The method of example 13 and further including generating a root node public key based on a hash of all the leaf node private keys.

15. The method of any of examples 13-14 and further including generating a message signature based on the public and private keys of one of the leaf nodes that has not yet been used to generate a message signature.

16. The method of any of examples 13-15 and further including validating a signed message that has been signed based on the public and private keys of one of the leaf nodes.

17. A machine-readable storage device has instructions for execution by a processor of a machine to cause the processor to perform operations to perform a method of generating keys for leaf nodes of a hash-based cryptographic signature tree. The operations include identifying a number, q, of the leaf nodes, associating each leaf node with a respective one of multiple parallel hash chains, loading a respective input register associated with each respective hash chain with a respective leaf node number q, cryptographic parameters, and a seed, receiving respective hash values from the respective hash chains, and populating the respective leaf nodes with the respective hash values comprising a respective private key for each leaf node.

18. The device of example 17 wherein the operations further include adding the respective hash values generated by the respective hash generators to the respective input registers, generating a respective public key as a function of the respective private key, and populating the respective leaf nodes with the respective public keys to create one time key signature pairs.

19. The device of example 18 wherein the operations further include generating a root node public key based on a hash of all the leaf node private keys.

20 The device of any of examples 18-19 wherein the operations further include generating a message signature based on the public and private keys of one of the leaf nodes that has not yet been used to generate a message signature.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A hash-based cryptographic system comprising:
hash input registers;
hash generators coupled in parallel with each other, each hash generator of the hash generators coupled to receive a corresponding hash input from one of the input registers; and
a controller coupled to the input registers and configured to provide the corresponding hash input to the hash registers to cause the parallel hash generators to generate a private key for corresponding leaf nodes of a hash-based signature tree structure.

2. The system of claim 1 wherein the hash-based signature tree structure comprises a Leighton-Micali Signature (LMS) signature tree structure.

3. The system of claim 1 wherein the controller is configured to provide the hash input register with a leaf node number and a seed such that the generator generates a private key for each leaf node.

4. The system of claim 1 wherein each hash generator includes a feedback loop coupled between an output of the hash generator to the respective input register.

5. The system of claim 4 wherein the feedback loop comprises a multiplexor coupled to receive the output of the hash generator and coupled to the controller.

6. The system of claim 5 wherein the controller is configured to populate the respective hash input register with the output of the hash generator such that the hash generator generates a public key as a function of the private key at each respective leaf node.

7. The system of claim 6 wherein the controller is configured to reconfigure the hash generators between calculating the private key and the public key.

8. The system of claim 6 wherein the controller is configured to reconfigure the hash generators between calculating the private key, the public key, a message signature, and validating a signed message.

9. The system of claim 8 wherein the controller is configured to generate a root node public key based on a hash of all the leaf node public keys.

10. The system of claim 8 wherein the controller is configured to generate a message signature based on the public key and the private key of one of the leaf nodes.

11. The system of claim 8 wherein the controller is configured to validate a signed message that has been signed based on the public and private keys of one of the leaf nodes.

12. A computer implemented method of generating keys for leaf nodes of a hash-based cryptographic signature tree comprising:
identifying a number, q, for each leaf nodes;
associating each leaf node with a respective one of multiple parallel hash chains;

loading a respective input register associated with each respective hash chain with a respective leaf node number q, cryptographic parameters, and a seed;

receiving respective hash values from the respective hash chains; and populating the respective leaf nodes with the respective hash values comprising a respective private key for each leaf node.

13. The method of claim 12 and further comprising:

adding the respective hash values generated by the respective hash generators to the respective input registers;

generating a respective public key as a function of the respective private key; and populating the respective leaf nodes with the respective public keys to create one-time key signature pairs.

14. The method of claim 13 and further comprising generating a root node public key based on a hash of all the leaf node private keys.

15. The method of claim 13 and further comprising generating a message signature based on the public and private keys of one of the leaf nodes that has not yet been used to generate a message signature.

16. The method of claim 13 and further comprising validating a signed message that has been signed based on the public and private keys of one of the leaf nodes.

17. A machine-readable storage device having instructions for execution by a processor of a machine to cause the processor to perform operations to perform a method of generating keys for leaf nodes of a hash-based cryptographic signature tree, the operations comprising:

identifying a number, q, of the leaf nodes;

associating each leaf node with a respective one of multiple parallel hash chains;

loading a respective input register associated with each respective hash chain with a respective leaf node number q, cryptographic parameters, and a seed;

receiving respective hash values from the respective hash chains; and populating the respective leaf nodes with the respective hash values comprising a respective private key for each leaf node.

18. The device of claim 17 wherein the operations further comprise:

adding the respective hash values generated by the respective hash generators to the respective input registers;

generating a respective public key as a function of the respective private key; and populating the respective leaf nodes with the respective public keys to create one time key signature pairs.

19. The device of claim 18 wherein the operations further comprise generating a root node public key based on a hash of all the leaf node private keys.

20. The device of claim 18 wherein the operations further comprise generating a message signature based on the public and private keys of one of the leaf nodes that has not yet been used to generate a message signature.

* * * * *